US010397091B1

(12) United States Patent
Gumier et al.

(10) Patent No.: US 10,397,091 B1
(45) Date of Patent: Aug. 27, 2019

(54) OPTICAL SAFETY AND CONNECTIONS DISCOVERY

(71) Applicant: Cisco Technology, Inc., San Jose, CA (US)

(72) Inventors: Luca Gumier, Milan (IT); Stefano Piciaccia, Milan (IT); Mauro Brunella, Brugherio (IT)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/132,993

(22) Filed: Sep. 17, 2018

(51) Int. Cl.
*H04L 12/751* (2013.01)
*H04J 14/02* (2006.01)
*H04B 10/079* (2013.01)
*H04Q 11/00* (2006.01)
*H04B 10/077* (2013.01)

(52) U.S. Cl.
CPC .......... *H04L 45/02* (2013.01); *H04B 10/079* (2013.01); *H04J 14/0221* (2013.01); *H04J 14/0227* (2013.01); *H04J 14/0268* (2013.01); *H04J 14/0275* (2013.01); *H04J 14/0297* (2013.01); *H04B 10/0775* (2013.01); *H04Q 11/0066* (2013.01)

(58) Field of Classification Search
CPC ...... H04L 45/02; H04L 7/027; H04J 14/0221; H04J 14/0268; H04J 14/0275; H04J 14/0297; H04J 3/04; H04J 3/06; H04J 3/16; H04J 3/0605
USPC ........ 398/141, 15, 17, 34, 94; 370/535, 470, 370/512, 410
See application file for complete search history.

(56) References Cited

U.S. PATENT DOCUMENTS

| 7,043,541 B1 * | 5/2006 | Bechtolsheim ..... H04L 41/0663 709/223 |
| 7,864,389 B2 * | 1/2011 | Muzicant ............... H04B 10/03 359/33 |
| 8,165,466 B2 | 4/2012 | Emery et al. |
| 8,175,458 B2 | 5/2012 | Way |
| 8,818,198 B2 * | 8/2014 | Trnkus ................ H04J 14/0227 14/227 |
| 9,312,953 B2 * | 4/2016 | Soto ................... H04B 10/0775 |
| 9,397,898 B2 | 7/2016 | Huliyar et al. |

(Continued)

OTHER PUBLICATIONS

Anonymous, Cisco ONS 15454 Multiservice Transport Platform, C78-601197-06, Feb. 2013, pp. 1-33.

*Primary Examiner* — Abbas H Alagheband
(74) *Attorney, Agent, or Firm* — Edell, Shapiro & Finnan, LLC

(57) ABSTRACT

At a first optical node of an optical communications system, during a signal initialization phase, a first optical pattern is received that includes a prefix indicating a beginning of a signal, a first word, and a first working signal for verifying stability of a connection between the first optical node and a second optical node of the optical communications system. A second optical pattern is transmitted that includes the prefix, a second word different from the first word, and the first working signal. A third optical pattern including the prefix, the first word, and a second working signal is received. Based on determining that a duration of the second working signal is greater than a duration of the first working signal plus a predetermined time, the first optical node determines that the second optical node is an adjacent node of the first optical node.

20 Claims, 7 Drawing Sheets

(56) References Cited

U.S. PATENT DOCUMENTS

| | | | |
|---|---|---|---|
| 9,585,111 B2* | 2/2017 | Dai | H04J 3/0605 |
| 9,729,948 B1* | 8/2017 | Subrahmaniam | G06F 16/235 |
| 2002/0126625 A1* | 9/2002 | Liu | H04Q 11/0062 |
| | | | 370/254 |
| 2007/0140696 A1* | 6/2007 | DeCusatis | H04J 14/08 |
| | | | 398/98 |
| 2009/0207954 A1* | 8/2009 | Dai | H04J 3/0605 |
| | | | 375/345 |
| 2010/0098410 A1* | 4/2010 | Krishnaswamy | H04Q 11/0062 |
| | | | 398/16 |
| 2010/0202772 A1* | 8/2010 | Wei | H04Q 11/0062 |
| | | | 398/16 |
| 2011/0002688 A1* | 1/2011 | Kang | H04J 14/0227 |
| | | | 398/30 |
| 2013/0071127 A1* | 3/2013 | Ota | H04B 10/2503 |
| | | | 398/139 |
| 2015/0208146 A1* | 7/2015 | Younce | H04Q 11/0066 |
| | | | 398/21 |
| 2016/0178125 A1* | 6/2016 | Nair | G05B 19/0425 |
| | | | 307/328 |
| 2017/0099099 A1* | 4/2017 | Papakos | H04J 14/021 |
| 2017/0111231 A1* | 4/2017 | Ashida | H04L 41/12 |
| 2017/0346891 A1* | 11/2017 | Yasuda | H04L 67/1068 |
| 2018/0295430 A1* | 10/2018 | Younce | H04Q 11/0066 |
| 2018/0365029 A1* | 12/2018 | Qiu | G06F 13/20 |

* cited by examiner

OPTICAL SAFETY AND CONNECTIONS DISCOVERY

TECHNICAL FIELD

The present disclosure relates to techniques for optical safety and connections discovery in a communication network.

BACKGROUND

A Dense Wavelength Division Multiplexed (DWDM) optical transmission system allows multiple signals to communicate on a single pair of optical fibers. DWDM systems have been adopted by telecommunication vendors to route signals throughout communications networks. In modern telecommunication systems, an optical power level up to 10 mW is considered safe for human eyes. However, power levels in optical fibers used for telecommunication applications normally exceed this value. For example, a commonly used Erbium Doped Fiber Amplifier (EDFA) emits a power level of more than 20 dBm (200 mW). When all fibers are connected, transmission at high power levels is not an issue. But in the event of a fiber cut/disconnection, for safety reasons, optical power levels need to be reduced very quickly below the 10 mW limit.

The power levels can be restored to greater than 10 mW only when all fibers are re-connected properly, with no possibility that an optical light beam could injure a human. There are strict requirements for power reduction and restoration in terms of timing and reliability of the mechanisms.

DESCRIPTION OF EXAMPLE EMBODIMENTS

Overview

Techniques are provided for a node to discover an adjacent node in an optical communication system. During a signal initialization phase, a first optical node of an optical communications system receives a first optical pattern including a prefix indicating a beginning of a signal, a first word, and a first working signal for verifying stability of a connection between the first optical node and a second optical node of the optical communications system. In response to the receiving, the first optical node transmits a second optical pattern including the prefix, a second word different from the first word, and the first working signal. After transmitting the second optical pattern, the first optical node receives a third optical pattern including the prefix, the first word, and a second working signal for verifying stability of the connection between the first optical node and the second optical node. The first optical node is configured to determine if a duration of the second working signal is greater than a duration of the first working signal plus a predetermined time. Based on determining that the duration of the second working signal is greater than the duration of the first working signal plus the predetermined time, the first optical node determines that the second optical node is an adjacent node of the first optical node. In one embodiment, based on determining that the duration of the second working signal is greater than the duration of the first working signal plus the predetermined time, the first optical node starts to transmit a normal data signal to the second optical node.

Example Embodiments

Figure 1:
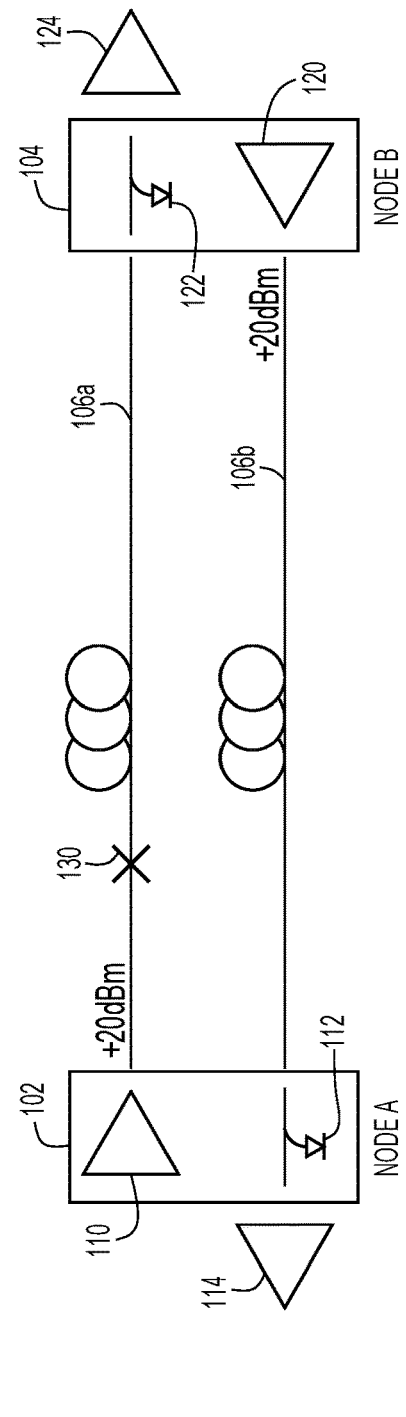
FIG. 1 depicts a fiber-cut condition in an optical communication system, according to an example embodiment.

Two optical nodes in an optical communication system can form a closed loop if a pair of optical fibers are correctly connected between the two optical nodes. If a fiber cut/disconnection happens in a closed loop, a photodiode on the receiving (RX) side of one node detects a loss of signal, which triggers a safety mechanism that turns off the laser on the transmitting (TX) side of the other node in the loop. Reference will now be made to FIG. 1. FIG. 1 depicts an example communication system 100 that includes two adjacent optical nodes, Node A (102) and Node B (104). Node A and Node B are connected by a pair of optical fibers 106a and 106b. Node A includes an optical transmitter 110 that includes a boost amplifier, an optical receiver 112 that includes a photo-detector, and a preamplifier 114. Node B includes an optical transmitter 120 that includes a boost amplifier, an optical receiver 122 that includes a photo-detector, and a preamplifier 124. The photo-detectors may be photodiodes, for example. When the fibers between the optical nodes 102 and 104 are properly connected, the optical nodes can transmit signals at a power level higher than 200 mW. In the proper connection, when signals are transmitted through the fibers 106a and 106b, the signals are tapped and measured by the photodiodes and forwarded to the respective preamplifiers 114 and 124. When a fiber cut indicated at 130 occurs in the upper fiber 106a between Node A and Node B, the receiver 122 at Node B detects a loss of signal. The receiver 122 of Node B then informs the transmitter 120 of Node B to turn off the transmission towards Node A. Thereafter, the receiver 112 of Node A detects a loss of signal and informs the transmitter 110 to turn off the transmission towards Node B. These actions bring the power in fibers 106a and 106b down to a safe level for human eyes according to the mandatory safety requirements.

When the fiber-cut at 130 is repaired and the fibers can be used for transmission again, the system 100 performs a mechanism to restore the normal data exchange between Node A and Note B. In one embodiment, transmitters 110 and 120 are automatically or manually turned on after a predetermined time after the fiber-cut is detected. For example, transmitters 110 and 120 are turned on at a safe power level for a predetermined time, e.g., 10 seconds. Nodes 102 and 104 then determine if their receivers 112 and 122 respectively, detects optical signal power. If the receivers 112 and 122 detect optical signal power, the nodes 102 and 104 determine that the fiber-cut failure has been removed/corrected. If receiver 112 and 122 detect the power level at the ON level for a time greater than a predetermined time, e.g., 10 seconds, the nodes 102 and 104 determine that the fibers have been restored, and normal data communications can be resumed. If one of the receivers 112 and 122 does not detect power, the nodes 102 and 104 determine that the fiber-cut failure has not been removed, and the nodes 102 and 104 turn off the transmitters 110 and 120, respectively. Nodes 102 and 104 wait for another predetermined time period, e.g., one minute, before attempting to again turn on transmitters 110 and 120.

The above techniques to fulfill safety requirements may not be practical in all cases. For example, for a long amplifier line chain, it can be difficult to set the correct pulse timings to allow restoration of power on all segments. Further, for Raman amplification, the power-low detection can be so unreliable that the above-described safety mechanism may not be used at all. In a further implementation of safety requirements, a dedicated light source and an additional photo-detector may be provided at a node.

In a DWDM optical platform, the optical communication system can leverage certain optical signals that are used to satisfy the mandatory safety requirements related to optical amplifiers. Each of the signals on a fiber has an assigned wavelength and is used between two adjacent nodes to create a closed loop. For example, signals for forming a closed loop may be communicated in an Optical Service Channel or Optical Supervisory Channel (OSC). A procedure is provided to verify the connectivity and the stability of the particular signals. For example, a loop is considered closed between two adjacent nodes when a signal communicated between the nodes is stable.

Figure 2:
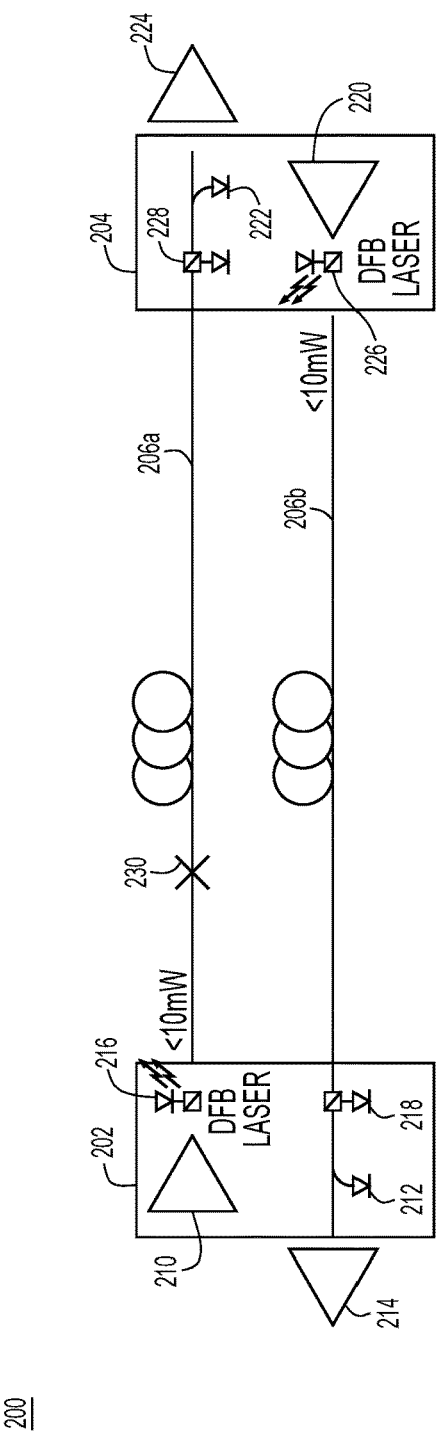
FIG. 2 depicts a fiber-cut condition in an optical communication system that includes distributed feedback lasers and photo-detectors, according to an example embodiment.

Reference is now made to FIG. 2. FIG. 2 depicts an example communication system 200 that includes two adjacent optical nodes 202 and 204. The system 200 employs dedicated light sources and additional photo-detectors for implementation of the Optical Supervisory Channel. The nodes 202 and 204 are connected by a pair of optical fibers 206a and 206b. The node 202 includes an optical transmitter 210 that includes a boost amplifier, a first photo-detector 212, a preamplifier 214, a first distributed feedback (DFB) laser 216 (a dedicated light source), and a second photo-detector 218 for detecting the light signal from the first DFB laser 216. The node 204 includes an optical transmitter 220 that includes a boost amplifier, a third photo-detector 222, a preamplifier 224, a second DFB laser 226 (a dedicated light source), and a fourth photo-detector 228 for detecting the light signal from the second DFB laser 226. When the fibers 206a and 206b are properly connected, the optical nodes 202 and 204 can transmit signals at a power level greater than 200 mW using the optical transmitters 210 and 220, respectively. When the fibers 206a and 206b are properly connected, the nodes transmit optical signals through the fibers 206a and 206b. The signals are tapped and measured through the photodiodes 212 and 222 and forwarded to the respective preamplifiers 214 and 224. Further, the DFB lasers 216 and 226 emit light signals through the fibers 206a and 206b. The second and fourth photo-detector 218 and 228 are configured to extract DFB signals from the fibers 206a and 206b by using a narrow-band filter, so that no other light sources can affect the measurement of the DFB signals. In one embodiment, a long fiber link may be divided into many independent rings/loops so that when a fiber cut happens, the power is dropped only in the impacted section. Link restoration is much faster in such a configuration.

When a fiber cut indicated at 230 in FIG. 2 occurs in the upper fiber 206a between nodes 202 and 204, the fourth photo-detector 228 detects a loss of signal as no DFB signal is transmitted to the fourth photo-detector 228. The transmitter 220 of the node 204 is notified to turn off or reduce the amplifier transmission towards the node 202 to a safe power level. Moreover, the DFB laser 226 of node 204 is configured to send a signal to the node 202 indicating the transmission power at the transmitter 210 should be turned off or reduced to a safe level. These actions bring the power in fibers 206a and 206 down to a safe level for human eyes according to the mandatory safety requirements. The power level transmitted by the DFB laser 216 or 226 is less than 10 mW, which is considered safe for human eyes, such that the power of the DFB lasers 216 and 226 does not need to be turned off in the event of a fiber cut.

Once the fiber line 206a is repaired and the fiber-cut condition is removed, the DFB photo-detector 228 can receive the DFB signals from the DFB laser 216 as the power of the DFB laser 216 is not turned off during the fiber-cut period. When this happens, the transmitter 220 at the node 204 is notified to resume normal data transmission at a high power level, e.g., higher than 200 mW. Also, the DFB laser 226 of node 204 sends a signal to the DFB photo-detector 218 to indicate that the power of the transmitter 210 at the node 202 can be restored to a normal operational power. These techniques satisfy the safety requirement and improve power restoration for normal data transmission after a fiber-cut failure.

The techniques disclosed herein leverage the dedicated light sources and photo-detectors in the OSC techniques to discover adjacent nodes for topology/connection discovery during a signal initialization phase.

Figure 3:
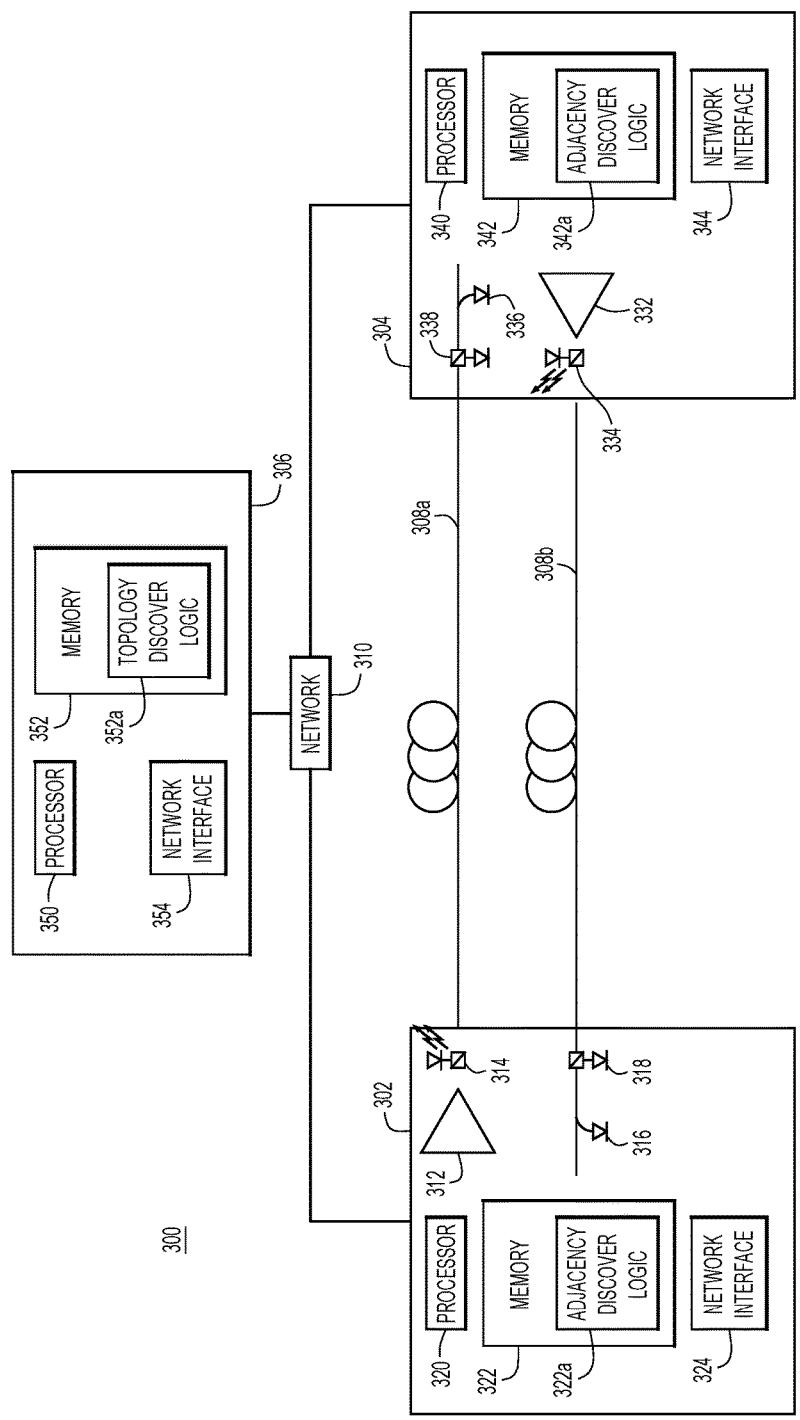
FIG. 3 depicts an optical communication system that facilitates adjacency and topology discovery, according to an example embodiment.

Reference is now made to FIG. 3. FIG. 3 depicts an example communication system 300 that facilitates topology discovery, according to an example embodiment. As illustrated in FIG. 3, the system 300 includes two nodes 302 and 304, and a network controller 306. It is to be understood that any number of nodes or controllers can be deployed in the system 300. The nodes 302 and 304 are connected by a pair of optical fibers 308a and 308b. The network controller 306 is connected the nodes 302 and 304 via the network 310. The node 302 includes a transmitter 312 configured to transmit data-modulated optical signals at a high power, e.g., more than 200 mW, an OSC transmitter 314 configured to transmit signals lower than 10 mW, a photo-detector 316 configured to detect data-modulated optical signals that may have a power level more than 200 mW, an OSC photo-detector 318 configured to detect signals transmitted by an OSC transmitter, a processor 320, a memory 322, and a network interface 324. The processor 320 is configured to execute instructions stored in the memory 322 to perform various control over the devices in node 302 including the transmitter 312, the OSC transmitter 314, the photo-detector 316, the OSC photo-detector 318, the memory 322, and the network interface 324. The transmitter 312 and the OSC transmitter 314 may be lasers or other suitable optical emitters. The photo-detector 316 and the OSC photo-detector 318 may be photodiodes or other suitable optical detectors. The memory 322 includes computer-executable instructions for adjacency discovery logic 322a that, when executed by processor 320, causes the optical node 302 to perform a procedure to discover adjacent nodes to the node 302, as described below.

The node 304 includes a transmitter 332 configured to transmit data-modulated optical signals at a high power, e.g., more than 200 mW, an OSC transmitter 334 configured to transmit optical signals lower than 10 mW, a photo-detector 336 configured to detect data-modulated optical signals that may have a power level more than 200 mW, an OSC photo-detector 338 configured to detect signals transmitted by an OSC transmitter, a processor 340, a memory 342, and a network interface 344. The processor 340 is configured to execute instructions stored in the memory 342 to perform various controls over the components in node 304 including the transmitter 332, the OSC transmitter 334, the photo-detector 336, the OSC photo-detector 338, the memory 342, and the network interface 344. The transmitter 332 and the OSC transmitter 334 may be lasers or other suitable optical emitters. The photo-detector 336 and the OSC photo-detector 338 may be photodiodes or other suitable optical detectors. The memory 342 stores computer-executable instructions for adjacency discovery logic 342a that, when executed by processor 340, cause the node 304 to perform the adjacency discovery procedure described below.

The network controller 306 includes a processor 350, a memory 352, and a network interface 354. The processor 350 is configured to execute instructions stored in the memory 352 to perform various actions described herein. The memory 352 stores executable instructions for topology discovery logic 352a that, when executed by processor 350, cause the controller 306 to perform a topology discovery procedure in system 300 managed by the network controller 306.

The processors 320, 340, and 350 of the node 302, node 304, and the controller 306 may be a microprocessor or microcontroller (or multiple instances of such components) that is configured to execute program logic instructions (i.e., software) for carrying out various operations and tasks described herein. For example, the processors 320 and 340 are configured to execute instructions for adjacency discovery logic 322a and 342a stored in the memories 322 and 342 to discover adjacent nodes. The processor 350 of the controller 306 is configured to execute instructions for topology discovery logic 352a stored in the memory 352 to discover topology in the system 300. Further descriptions of the operations performed by the processors 320, 340, and 350 of the node 302, node 304, and the controller 306 when executing instructions stored in the memories 322, 342, and 352 will be provided below.

The memories 322, 342, and 352 may include read only memory (ROM), random access memory (RAM), magnetic disk storage media devices, optical storage media devices, flash memory devices, electrical, optical or other physical/tangible memory storage devices.

The functions of the processors 320, 340, and 350 may be implemented by logic encoded in one or more tangible (non-transitory) computer-readable storage media (e.g., embedded logic such as an application specific integrated circuit, digital signal processor instructions, software that is executed by a processor, etc.), wherein the memories 322, 342, and 352 store data used for the operations described herein and store software or processor executable instructions that are executed to carry out the operations described herein.

The topology discovery logic 352a and adjacency discovery logics 322a and 342a may take any of a variety of forms, so as to be encoded in one or more tangible/non-transitory computer readable memory media or storage device for execution, such as fixed logic or programmable logic (e.g., software/computer instructions executed by a processor), and the processors 320, 340, and 350 may be an application specific integrated circuit (ASIC) that comprises fixed digital logic, or a combination thereof.

For example, the processors 320, 340, and 350 may be embodied by digital logic gates in a fixed or programmable digital logic integrated circuit, which digital logic gates are configured to perform the topology discovery logic 352a or the adjacency discovery logics 322a and 342a. In general, the topology discovery logic 352a or the adjacency discovery logics 322a and 342a may be embodied in one or more computer-readable storage media encoded with software comprising computer executable instructions and when the software is executed operable to perform the operations described herein.

The communication interfaces 324, 344, and 354 are configured to transmit signals to or receive signals from the network(s) 310 for the node 302, the node 304, and the controller 306, respectively. In one example, the communication interfaces 324, 344, and 354 include one or more network interface cards or line cards. The network 310 may be an Internet Protocol (IP) network or other Layer 3 network.

During a signal initialization phase, the nodes 302 and 304 can initiate an adjacency discovery procedure to discover the nodes adjacent to them. Taking node 302 as an example, the processor 320 of the node 302 executes the adjacency discovery logic 322a to discover adjacent nodes. For example, the processor 320 receives a first optical pattern including a prefix indicating a beginning of a signal, a first word, and a first working signal for verifying stability of a connection between the node 302 and a second optical node of the optical communications system 300, e.g., node 304. An example optical pattern 400 to be sent during a signal initialization phase is illustrated in FIG. 4.

Figure 4:
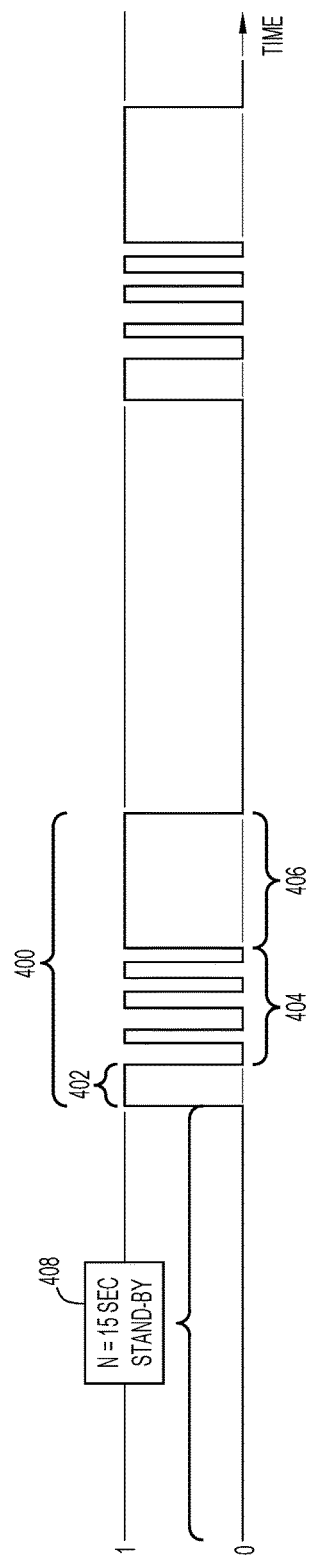
FIG. 4 depicts the use of optical patterns for optical node adjacency discovery, according to an example embodiment.

Referring to FIG. 4, the pattern 400 includes a prefix 402, a word 404, and a working signal 406. Prior to the optical pattern, a predetermined stand-by time period 408 is present. The stand-by period 408 and the optical pattern 400 can be repeated a number of times to ensure adjacency discovery. In one embodiment, the stand-by period 408 may be, for example, about 15 seconds or other suitable time. The duration of the word 404 may be, for example, 7.2 seconds, and the duration of the working signal 406 may be, for example, 3 seconds. In one embodiment, the word 404 may be 32 bits transmitted at 5 Hz. In some embodiments, the processor 320 of node 302 receives the first optical pattern via the OSC photo-detector 318 connected to the fiber 308b. In some embodiments, the durations of the stand-by period 408 and the working signal 406 are selected to facilitate the processor 320 to identify the status/stability of the signals.

Referring back to FIG. 3, in response to receiving the first optical pattern, the processor 320 of the node 302 controls the OSC transmitter 314 to transmit a second optical pattern that includes the prefix, a second word different from the first word, and the first working signal. The second optical pattern is similar to the pattern 400 illustrated in FIG. 4 except the second word in the second pattern is different from the first word in the first pattern. The second optical pattern precedes a predetermined stand-by time period, e.g., 15 seconds. The stand-by period and the second optical pattern can be repeatedly transmitted a number of times to ensure adjacency discovery. In some embodiments, the first word is indicative of a unique identifier of an adjacent optical node, e.g., node 304, while the second word is indicative of a unique identifier of the node 302. In a further embodiment, the first word and the second word are Ethernet interface media access control addresses. In some embodiments, the unique identifiers of the nodes are assigned by the network controller 306 or may be provided by an administrator of the system 300.

After transmitting the second optical pattern, the processor 320 of the node 302 determines if it further receives a third optical pattern including the prefix, the first word, and a second working signal. If the processor 320 receives those signals, it determines whether a duration of the second working signal is longer/greater than a duration of the first working signal plus a predetermined time. The duration of the second working signal is configured such that if it lasts longer than the first working signal plus the predetermined time, it can be determined that the node identified by the first word is an adjacent node and the link between the two nodes are considered stable such that a normal data signal can be transmitted to the adjacent node. That is, the processor 320 can instruct the transmitter 312 to start sending normal data-modulated optical signals in a high power level, e.g., higher than 200 mW. In one embodiment, the predetermined time is about, for example, 2 seconds.

Figure 5:
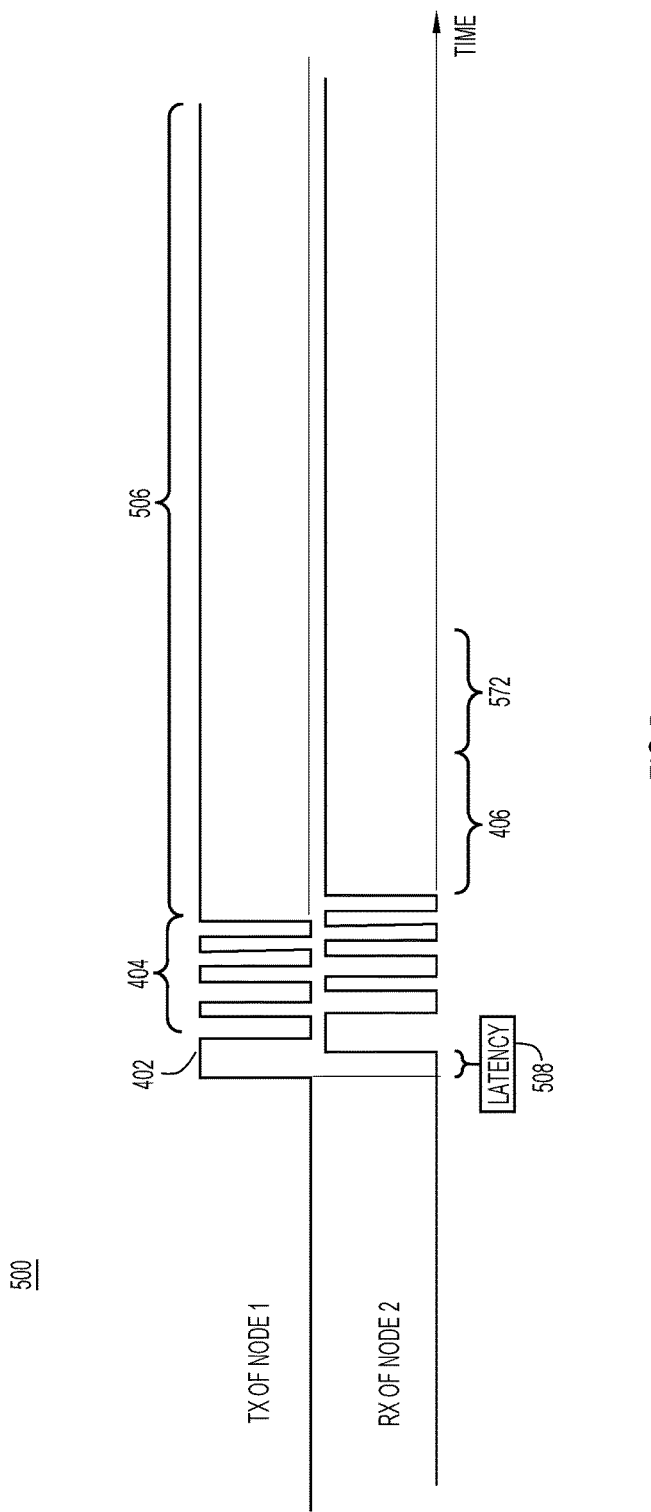
FIG. 5 depicts the use of optical patterns transmitted by a transmitter and received by a receiver for optical node adjacency discovery, according to an example embodiment.

An example third optical signal is shown in FIG. 5. FIG. 5 depicts an example third optical pattern 500 as it is sent by a transmitter (TX) of a sending node and as it is received by a receiver (RX) of a receiving node. The third optical pattern 500 includes the prefix 402, the first word 404, and the second working signal 506. The transmission of the third optical pattern in a fiber results in a small latency 508 before the third optical pattern is received by the receiver. The latency is typically in a range of microseconds. After the receiving node receives the third optical pattern, the receiving node determines whether a duration of the second working signal 506 is longer/greater than a duration of the first working signal 406 plus a predetermined integration period 512. If the duration of the second working signal 506 is greater than the duration of the first working signal 406 plus a predetermined integration period 512, as shown in FIG. 5, it can be determined that the node 304 is a node adjacent to node 302 and the optical links therebetween are stable for normal data transmission. If the duration of the second working signal 506 is not longer/greater than the duration of the first working signal 406 plus the predetermined integration period 512, the processor 320 is configured to transmit the second optical pattern.

Although the optical patterns as presented above are transmitted via OSC transmitter 314 and received via OSC photo-detector 318, the optical patterns initiated during the signal initialization phase may be transmitted on a communication channel other than an Optical Service Channel. Any laser source and photo-detector can be employed for transmitting and receiving the optical patterns.

Once each node has identified its adjacent node(s), the adjacency information may be sent to the network controller 306 through network 310. The processor 350 of the network controller 306 executes the topology discovery logic 352*a* to establish the topology of the system 300 using the adjacency information acquired from the nodes in the system 300. The topology of the system 300 is then stored in the memory 352.

Figure 6:
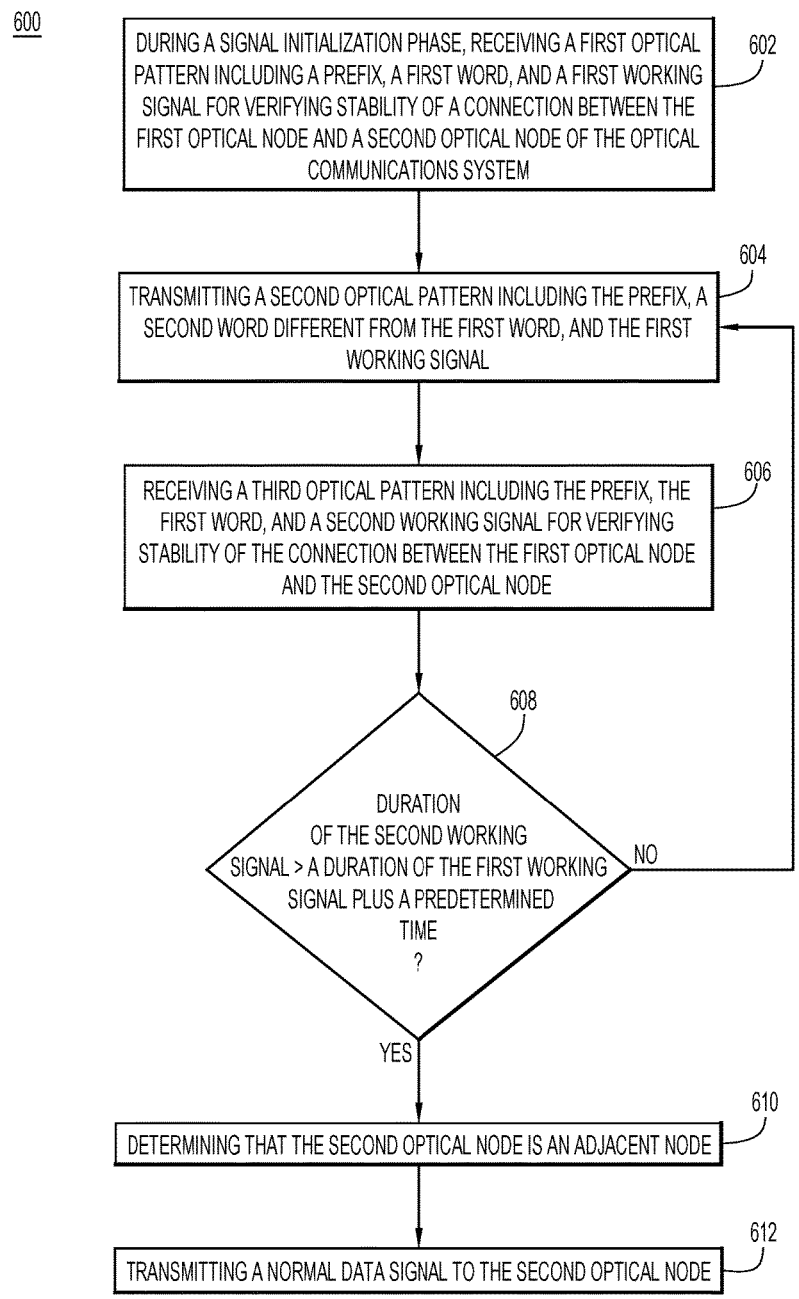
FIG. 6 is a flow chart of a method performed by an optical node in a communication system for node adjacency discovery, according to an example embodiment.

FIG. 6 is a flow chart of a method 600 performed by an optical node in a communication system for adjacency discovery, according to an example embodiment. At 602, during a signal initialization phase, a first node receives a first optical pattern including a prefix indicating a beginning of a signal, a first word, and a first working signal for verifying stability of a connection between the first optical node and a second optical node of the communications system. At 604, in response to receiving the first optical pattern, the first node transmits a second optical pattern including the prefix, a second word different from the first word, and the first working signal. At 606, the first node receives a third optical pattern including the prefix, the first word, and a second working signal for verifying stability of the connection between the first optical node and the second optical node. At 608, the first node determines if a duration of the second working signal is greater than a duration of the first working signal plus a predetermined time. If the duration of the second working signal is longer/greater than the duration of the first working signal plus the predetermined time (Yes at 608), at 610 the first node determines that the second optical node is an adjacent node of the first optical node. At 612, the first node transmits a normal data-modulated optical signal to the second optical node. If the duration of the second working signal is not longer/greater than the duration of the first working signal plus the predetermined time (No at 608), the method 600 returns to 604 where the first node transmits the second optical pattern.

Figure 7:
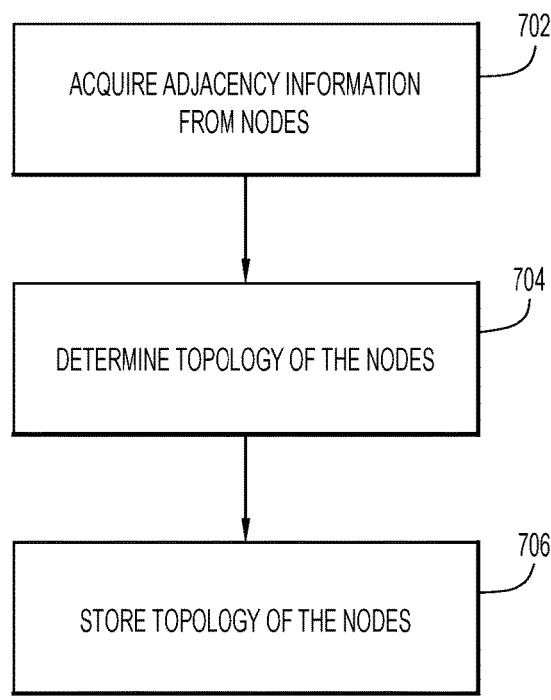
FIG. 7 is a flow chart illustrating a method performed by a network controller for topology discovery in a communication system, according to an example embodiment.

FIG. 7 is a flow chart illustrating a method 700 performed by a network controller for topology discovery in a communication system according to an example embodiment. At 702, the network controller acquires adjacency information from nodes in the communication system. For example, a processor of the network controller may inquire the nodes to send information regarding their neighboring nodes. In one embodiment, a node may discover its adjacent nodes using the method 600 described above. A node may store the unique identifiers of its adjacent nodes and provide such information to the network controller. At 704, the network controller determines the topology of the communication system using the adjacency information acquired from the nodes in the system. At 706, the topology information mapped in 704 is stored in a memory associated with the network controller.

Techniques disclosed herein enable connection/topology discovery in an optical communication system. The example methods reduce, and to some extent avoid, the communications between nodes for topology/connection discovery, when the system is in a stable condition. In some embodiments, this solution does not use additional hardware, a distributed protocol, or additional intelligence in the network management tools. The connection/topology discovery techniques do not use an existing channel protocol. That is, even when channel data flow is disrupted, connection/topology discovery can still be performed if lasers are enabled on the optical nodes.

In some embodiments, utilizing signals in the initialization phase enables discovery of the connections between different nodes. The presented techniques employ processes that send, during the signal initialization phase, a word and a unique identifier (based on the Ethernet interface MAC address) used by a network management function/entity to identify the nodes and their neighbor relationships. In one embodiment, the techniques leverage signals used to satisfy optical safety requirements for topology/connection discovery and network device identity advertisement without adding additional hardware or using distributed protocols.

In summary, in one form, a method is disclosed that includes: at a first optical node of an optical communications system, during a signal initialization phase, receiving a first optical pattern including a prefix indicating a beginning of a signal, a first word, and a first working signal for verifying stability of a connection between the first optical node and a second optical node of the optical communications system; in response to the receiving, transmitting a second optical pattern including the prefix, a second word different from the first word, and the first working signal; after transmitting the second optical pattern, receiving a third optical pattern including the prefix, the first word, and a second working signal for verifying stability of the connection between the first optical node and the second optical node; determining if a duration of the second working signal is greater than a duration of the first working signal plus a predetermined time; and based on determining that the duration of the second working signal is greater than the duration of the first working signal plus the predetermined time, determining that the second optical node is an adjacent node of the first optical node.

In another form, an apparatus is disclosed. The apparatus includes an optical communication interface that enables network communications on behalf of a first optical node, a processor, and a memory to store data and instructions executable by the processor. The processor is configured to execute the instructions to: during a signal initialization phase, receive a first optical pattern including a prefix indicating a beginning of a signal, a first word, and a first working signal for verifying stability of a connection between the first optical node and a second optical node in an optical communications system; in response to receiving the first optical pattern, transmit a second optical pattern including the prefix, a second word different from the first word, and the first working signal; after transmitting the second optical pattern, receive a third optical pattern including the prefix, the first word, and a second working signal for verifying stability of the connection between the first optical node and the second optical node; determine if a duration of the second working signal is greater than a duration of the first working signal plus a predetermined time; and based on determining that the duration of the second working signal is greater than the duration of the first working signal plus the predetermined time, determine that the second optical node is an adjacent node of the first optical node.

In yet another form, a non-transitory computer-readable storage medium encoded with software comprising computer executable instructions which, when executed by a processor of a first optical node of an optical communications system, cause the processor to: during a signal initialization phase, receive a first optical pattern including a prefix indicating a beginning of a signal, a first word, and a first working signal for verifying stability of a connection between the first optical node and a second optical node of the optical communications system; in response to receiving the first optical pattern, transmit a second optical pattern including the prefix, a second word different from the first word, and the first working signal; after transmitting the second optical pattern, receive a third optical pattern including the prefix, the first word, and a second working signal for verifying stability of the connection between the first optical node and the second optical node; determine if a duration of the second working signal is greater than a duration of the first working signal plus a predetermined time; and based on determining that the duration of the second working signal is greater than the duration of the first working signal plus the predetermined time, determine that the second optical node is an adjacent node of the first optical node.

The above description is intended by way of example only. Various modifications and structural changes may be made therein without departing from the scope of the concepts described herein and within the scope and range of equivalents of the claims.

What is claimed is:

1. A method comprising:
   at a first optical node of an optical communications system:
   during a signal initialization phase, receiving a first optical pattern including a prefix indicating a beginning of a signal, a first word, and a first working signal for verifying stability of a connection between the first optical node and a second optical node of the optical communications system;
   in response to the receiving, transmitting a second optical pattern including the prefix, a second word different from the first word, and the first working signal;
   after transmitting the second optical pattern, receiving a third optical pattern including the prefix, the first word, and a second working signal for verifying stability of the connection between the first optical node and the second optical node;
   determining if a duration of the second working signal is greater than a duration of the first working signal plus a predetermined time; and
   based on determining that the duration of the second working signal is greater than the duration of the first working signal plus the predetermined time, determining that the second optical node is an adjacent node of the first optical node.

2. The method of claim 1, wherein the first word is indicative of a unique identifier of the second optical node.

3. The method of claim 2, wherein the second word is indicative of a unique identifier of the first optical node.

4. The method of claim 3, wherein the first word and the second word are Ethernet interface media access control addresses.

5. The method of claim 1, further comprising:
   in response to determining that the duration of the second working signal is greater than the duration of the first working signal plus the predetermined time, transmitting a data modulated optical signal to the second optical node.

6. The method of claim 1, wherein the transmitting and the receiving are performed in a communication channel other than an optical service channel.

7. The method of claim 1, further comprising:
   based on determining that the duration of the second working signal is not greater than the duration of the first working signal plus the predetermined time, transmitting the second optical pattern.

8. An apparatus, comprising:
   an optical communication interface that enables optical network communications on behalf of a first optical node;
   a processor; and
   a memory to store data and instructions executable by the processor,
   wherein the processor is coupled to the optical communication interface and to the memory, and is configured to execute the instructions to:
   during a signal initialization phase, receive a first optical pattern including a prefix indicating a beginning of a signal, a first word, and a first working signal for verifying stability of a connection between the first optical node and a second optical node in an optical communications system;
   in response to receiving the first optical pattern, transmit a second optical pattern including the prefix, a second word different from the first word, and the first working signal;
   after transmitting the second optical pattern, receive a third optical pattern including the prefix, the first word, and a second working signal for verifying stability of the connection between the first optical node and the second optical node;
   determine if a duration of the second working signal is greater than a duration of the first working signal plus a predetermined time; and based on determining that the duration of the second working signal is greater than the duration of the first working signal plus the predetermined time, determine that the second optical node is an adjacent node of the first optical node.

9. The apparatus of claim 8, wherein the first word is indicative of a unique identifier of the second optical node.

10. The apparatus of claim 9, wherein the second word is indicative of a unique identifier of the first optical node.

11. The apparatus of claim 10, wherein the first word and the second word are Ethernet interface media access control addresses.

12. The apparatus of claim 8, wherein the processor is configured to execute the instructions to:
based on determining that the duration of the second working signal is greater than the duration of the first working signal plus the predetermined time, transmit a data modulated optical signal to the second optical node.

13. The apparatus of claim 8, wherein the processor is configured to transmit and receive the optical patterns in a communication channel other than an optical service channel.

14. The apparatus of claim 8, wherein the processor is configured to execute the instructions to:
based on determining that the duration of the second working signal is not greater than the duration of the first working signal plus the predetermined time, transmit the second optical pattern.

15. A non-transitory computer-readable storage medium encoded with software comprising computer executable instructions which, when executed by a processor of a first optical node of an optical communications system, cause the processor to:
during a signal initialization phase, receive a first optical pattern including a prefix indicating a beginning of a signal, a first word, and a first working signal for verifying stability of a connection between the first optical node and a second optical node of the optical communications system;
in response to receiving the first optical pattern, transmit a second optical pattern including the prefix, a second word different from the first word, and the first working signal;
after transmitting the second optical pattern, receive a third optical pattern including the prefix, the first word, and a second working signal for verifying stability of the connection between the first optical node and the second optical node;
determine if a duration of the second working signal is greater than a duration of the first working signal plus a predetermined time; and
based on determining that the duration of the second working signal is greater than the duration of the first working signal plus the predetermined time, determine that the second optical node is an adjacent node of the first optical node.

16. The non-transitory computer-readable storage medium of claim 15, wherein the first word is indicative of a unique identifier of the second optical node.

17. The non-transitory computer-readable storage medium of claim 16, wherein the second word is indicative of a unique identifier of the first optical node.

18. The non-transitory computer-readable storage medium of claim 17, wherein the first word and the second word are Ethernet interface media access control addresses.

19. The non-transitory computer-readable storage medium of claim 15, wherein the instructions further cause the processor to:
based on determining that the duration of the second working signal is greater than the duration of the first working signal plus the predetermined time, transmit a data modulated optical signal to the second optical node.

20. The non-transitory computer-readable storage medium of claim 15, wherein the instructions further cause the processor to:
based on determining that the duration of the second working signal is not greater than the duration of the first working signal plus the predetermined time, transmit the second optical pattern.

* * * * *